United States Patent [11] 3,602,896

[72] Inventor David Zeheb
Hillsdale, N.J.
[21] Appl. No. 837,835
[22] Filed June 30, 1969
[45] Patented Aug. 31, 1971
[73] Assignee International Business Machines Corporation Armonk, N.Y.

[54] RANDOM ACCESS MEMORY WITH FLEXIBLE DATA BOUNDARIES

8 Claims, 14 Drawing Figs.

[52] U.S. Cl. .......... 340/172.5
[51] Int. Cl. .......... G11c 7/00
[50] Field of Search .......... 340/172.5

[56] References Cited

UNITED STATES PATENTS 3,109,162 10/1963 Wolensky .......... 340/172.5
3,271,745 9/1966 Schauer .......... 340/172.5

*Primary Examiner*—Raulfe B. Zache
*Attorneys*—Hanifin and Jancin and Roy R. Schlemmer, Jr.

ABSTRACT: A multiword random access memory wherein each memory word comprises a plurality of distinct addressable sections or bytes. Controls are provided to allow the addressing of a given data word stored in memory having up to M addressable bytes wherein said data word may be addressed beginning on any byte of a memory word. Thus, an accessed data word may overlap one memory word boundary into an adjacent memory word. Appropriate word drive line rotation circuitry is provided in order that the proper drive lines be addressed in a single access cycle.

INVENTOR
DAVID ZEHEB

BY [signature]
ATTORNEY

FIG. 6 BIDIRECTIONAL GATE (SEE FIG. 4)
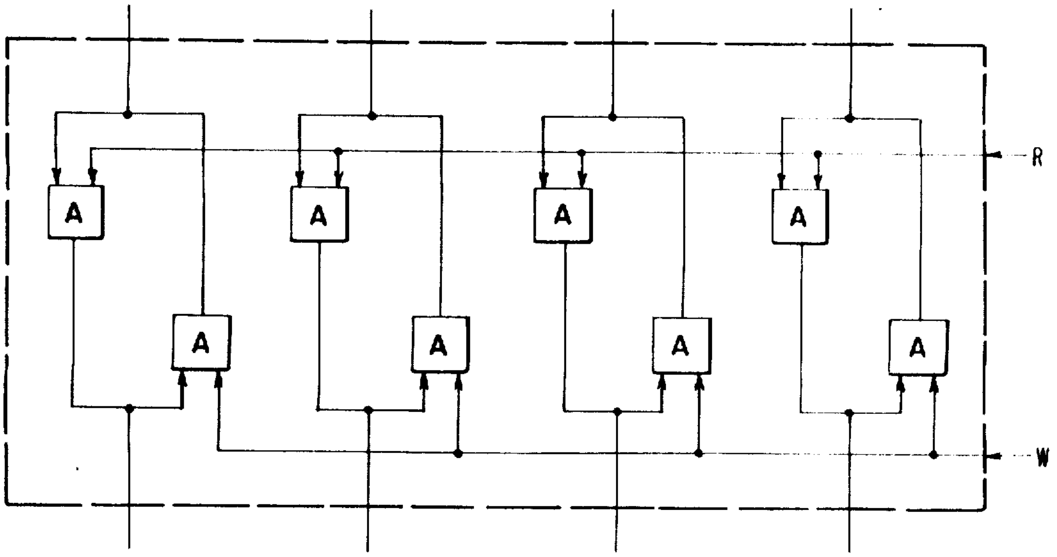
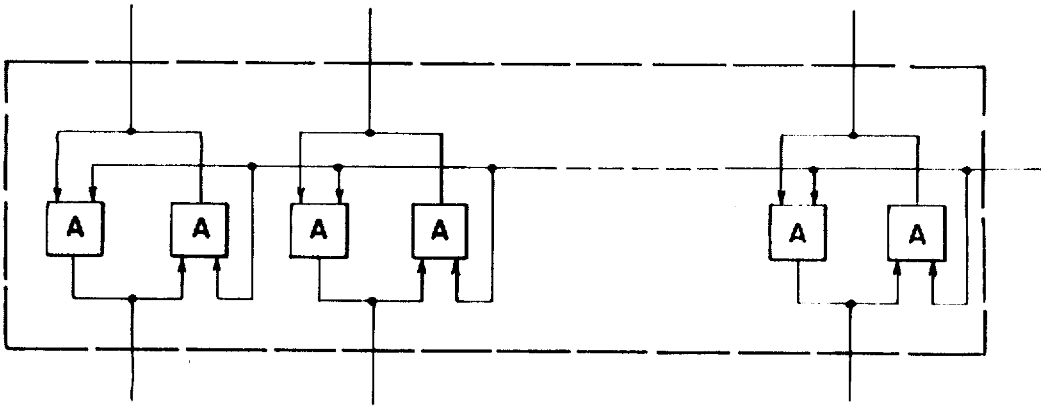
FIG. 7 BIDIRECTIONAL GATE ( SEE FIG. 5)

RANDOM ACCESS MEMORY WITH FLEXIBLE DATA BOUNDARIES

BACKGROUND OF THE INVENTION

The computer industry is continually making efforts to increase the effective speed and thus the power of modern electronic computers. The present state of technology of the computer industry is such that the majority of circuit devices, as well as memory storage elements, are reaching the speed at which the velocity of electrons within a conductor becomes the primary limiting factor in determining the ultimate speed of computation or information transfer within a given machine. It is thus apparent that the effective speed and power of computers must be increased by other means.

One of the primary speed limiting areas in modern computers is the memory wherein certain of the data storage phenomena therein have limiting factors which make it extremely difficult and expensive to greatly increase memory speeds. Extremely complex hierarchical memory organizations have been proposed in the past to allow for the multiple accessing of words within the overall system assuming of course that the data is properly loaded into the memory hierarchy. However, in smaller machines, complex memories of this type are not feasible as the relatively small scale customer would not be able to afford the expense of such a memory system. A small computer normally utilizes a single random access memory for storage of data. As will be well understood the processor stores data in the memory and retrieves it as needed. In order to minimize the number of times the processor has to access memory and thus increase speed, it is desirable to make the data width of the memory as wide as practical. On the other hand, in order to increase programming convenience, it is desirable to make the smallest addressable unit as small as practical. As an example, in a number of commercial systems, the smallest addressable unit is the eight bit byte whereas the width of the memory itself is typically much wider. Eight-bit bytes are very convenient data increments to utilize; however in conventional systems, in order to get at a given 8-bit byte, the entire memory word must be accessed. To complicate the situation further, in many instances, although a given number of bytes will be present in a machine word, it may well be that a given number of bytes are not in the same machine word but in contiguous machine words. Thus, say bytes 1 and 2 are at a first address and bytes 3 and 4 of a particular data segment desired are in the next adjacent word location in memory. In most machines, in order to obtain a set of contiguous bytes so located, it would be necessary to effect two memory access cycles with the attendant time delay.

Assume as an example that a conventional memory system has a memory width at 32 bits and the smallest addressable unit is an 8-bit byte. There would be four addressable units or bytes in any one memory word. It may be desired to access any of the four bytes as the first byte of a four byte data word. As stated before, the double accessing of the memory would considerably limit the speed of the overall computer system. The conventional way of overcoming this problem, which has been used in the past, is to insist that all data words begin on a memory word boundary. However, this is often undesirable because it prevents complete packing of data and places restrictions on the programmer. On the other hand, if the programmer is released from this restriction, the situation arises where the actual system is slowed due to double accessing.

It may therefore be readily seen that it would be desirable in a relatively conventional 3—D random access memory to be able to read or write data words beginning at any desired byte location within a given memory word and to continue with such operation up to at least the full width of a memory word even if it necessitates overlapping into an adjacent storage location. In addition to allowing single accesses of a memory with such a flexible data boundary addressing feature, such a memory organization would allow considerably improved memory packing.

SUMMARY OF THE INVENTION AND OBJECTS

It has been found that the disadvantages of imposing memory word boundaries on data word structure may be avoided by providing special addressing circuitry in a more or less conventionally organized three dimensional random access memory. Individual data word bytes appearing in two adjacent addressable word locations in memory may be accessed on a single memory access cycle. In essence, the address drive lines for the memory are broken up into a desired number of byte sized segments and each of the segments is essentially driven separately under control of specially provided addressing. A special memory addressing feature is provided whereby the initial byte location in a given memory word is provided and a number of bytes corresponding to one memory word in length may be accessed in the ensuing memory access cycle. The sense and inhibit circuitry for the memory remains otherwise conventional. It should be noted however that in the disclosed embodiment the organization of the data appearing in the memory data register subsequent to a read out operation must be known to the programmer in order to properly organize this data for subsequent operations. In other words, the data appearing in the low order bytes of the data register may properly belong at the end of the data word. However, this will be apparent from the subsequent description of the invention.

It may thus be seen that the present memory configuration is capable of giving up to a fifty percent saving in machine memory access time when a great deal of data boundary overlap occurs in certain data organizations. The configuration will further allow an essentially greater compacting of data within the memory.

It is accordingly a primary object of the present invention to provide a random access memory wherein data word boundaries need have no fixed relation to memory word boundaries.

It is yet another object of the invention to provide such a memory system which is addressable beginning with any byte location within a memory word and wherein as many consecutive bytes may be accessed as there are bytes in a memory word.

It is a further object of the invention to provide such a memory system wherein the memory drivers are separated into byte sized segments and means are provided for selecting and driving desired groups of said addressing lines.

The foregoing and other objects, features and advantages of the invention, will be apparent from the following more particular description of a preferred embodiment of the invention, as illustrated in the accompanying drawings.

DESCRIPTION OF THE DRAWINGS

FIG. 6 is a detailed logical schematic showing one of the bidirectional Read-Write gates shown on FIG. 4.

FIG. 7 is a detailed logical schematic of the bidirectional gate circuits shown on FIGS. 5A and 5C.

DESCRIPTION OF THE DISCLOSED EMBODIMENT

The objects of the present invention are accomplished in general by a random access memory organized wherein each memory word consists essentially of M bytes, said memory including means for accessing a data word of up to M bytes beginning at any specified byte within a given memory word. Means are included in the memory address register for specifying the particular byte at which a given data word access is to begin, and further means are included for energizing the proper drive lines of said memory so that only those bytes specified are actually accessed and wherein all such bytes are accessed in a single memory access cycle which cycle may occur in two contiguous addressable memory word storage locations.

In the disclosed preferred embodiment of the invention the memory is a three dimensional random access magnetic memory having conventional X and Y address decoding circuitry and conventional memory drivers, sense and inhibit circuitry. The memory is organized into as many separate blocks as there are bytes in a memory word. The X and Y drive lines in each block are conventional and a given X and Y drive line may be interconnected to proceed serially through all blocks. However, interposed between the various blocks of the memory are a plurality of two directional gate circuits which function under control of the present byte accessing circuitry so that only those sections of memory or bytes of data, which are to be accessed, receive full select current.

Figure 1:
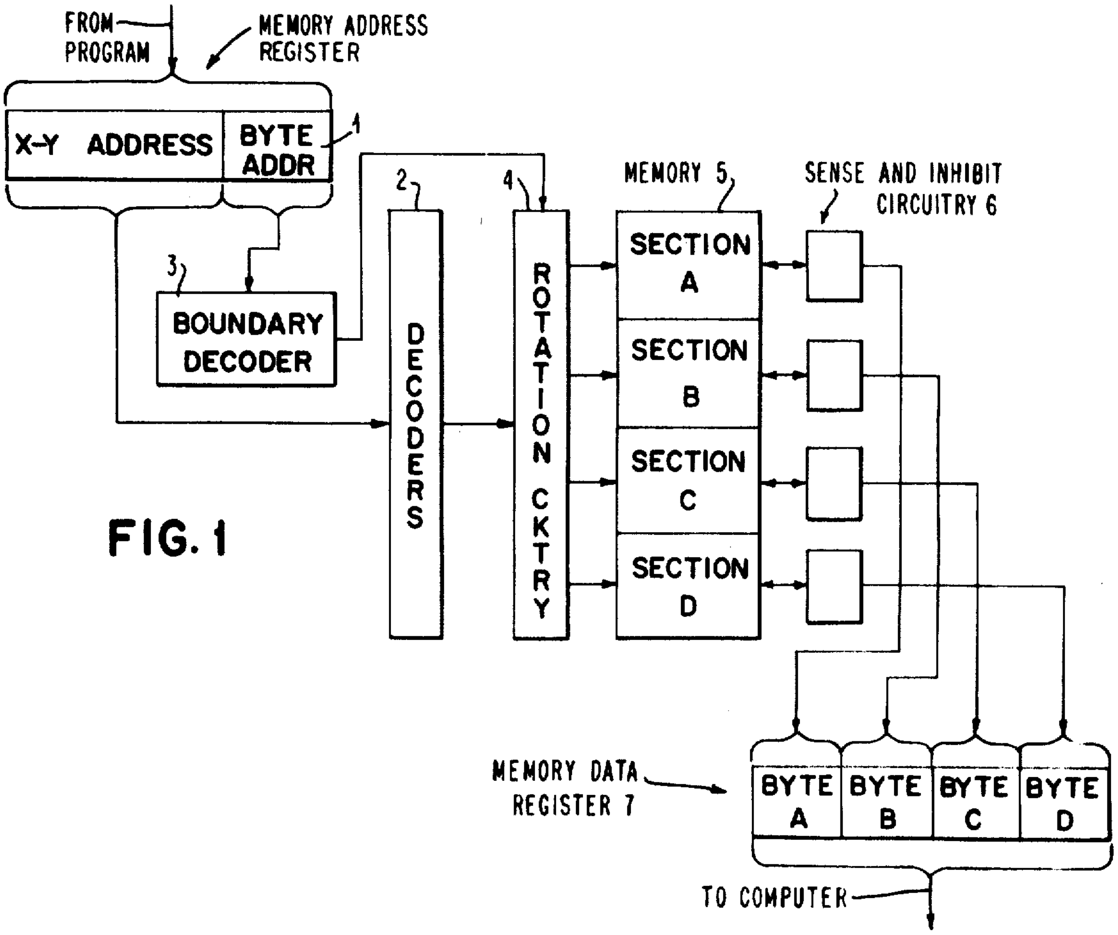
FIG. 1 comprises a functional block diagram of a byte addressable random access memory constructed in accordance with the teachings of the present invention.

The memory readout or sense circuitry is not shown in detail as it is quite conventional wherein each plane of the memory contains a single sense winding which would be brought out directly to an appropriate sense amplifier and the readout data ultimately stored in the memory data register shown on FIG. 1. While in the present embodiment no rotation circuitry is shown for the memory readout circuits, such could be incorporated by a routineer in the art. Thus, the contents of the memory data register after any given read out cycle would be in one of the forms shown in FIG. 2. However, this data could easily be rearranged so that, for example, in the memory word designated by the reference character 014, byte C at address K could be located at the first byte location in the memory data register, byte D at address K would be located in the second byte location in the memory data register, byte A at address K+1 would be located at the third byte location in the memory data register and finally byte B at address K+1 would be located in the last byte storage location of the memory data register. This circuitry would also operate under control of the byte address portion of the overall memory address as received by the memory system.

The memory system disclosed thus allows the programmer to specify a beginning byte address at any desired location within a memory word. Beginning with that particular byte location, as many bytes will be automatically accessed as there are bytes in a memory word even though the bytes run over to the next adjacent memory word location. The specific manner in which the various memory addresses are generated and the manner in which the memory is organized will be apparent from the subsequent description of the combination functional and logic diagrams of FIGS. 4 and 5. It should be noted that in the subsequent general reference to these figures, a reference to FIG. 4 generally applies to FIGS. 4A, B and C and similarly a general reference to FIG. 5 applies to the composite of FIGS. 5A–D. When a specific figure reference is made, i.e. to FIG. 5C it will be so stated.

Referring first to FIG. 1, the overall organization of the present system is set forth. It should first be noted that in the presently disclosed embodiment, it is assumed that there are four bytes in each memory word, i.e., A, B, C, and D, and further that there are a total of 16 words in the memory. It will of course be obvious that these relatively small numbers were chosen for purposes of convenient description and that any desired number of bytes or memories of much larger word storage capacity could readily be built utilizing the basic teachings of the present invention as will be apparent from the subsequent description.

In FIG. 1 the memory address register 1 is conventionally loaded from program control and operates in a conventional manner. It is noted that there are two portions of this register, one of which stores the conventional X-Y address and the other which stores the byte address. This section of the memory address register is also duplicated on FIG. 5A. The output of the X-Y address containing portion of the memory address registers is directed into the decoders 2 which serve the function of producing the X and Y address line select. The single output from the decoder 2 is shown as passing into the rotation circuitry block 4.

The output of the boundary decoder 3 which receives an input from the byte address portion of the memory address register decodes this byte address and determines whether the first byte of a particular data word desired is A, B, C, or D. Depending upon the determination made, the X-Y drive currents are first directed into sections A, B, C, D of the main memory. This rotation is under control of the rotation circuitry 4 in accordance with the output of the boundary decoder 3. The four outputs from the rotation circuitry are shown to conform the block diagram as nearly as possible with the specifically disclosed embodiment of FIGS. 4 and 5. Thus, depending upon which byte is to be accessed first, say byte B, the output line going into section 2 of the memory would be energized and the drive currents would access the proper bytes in sections B, C, D, A respectively. It will be assumed at this point, although it will also be more specifically described subsequently, that only the four bytes desired will receive the full select drive necessary to cause access of the desired storage locations to cause the condition of their related storage elements to be either read out or stored. This is so regardless of whether or not the desired bytes are in the same memory word. In this way completely conventional sense and inhibit circuitry may be utilized. Thus referring to FIG. 1, the output of the memory is fed on the memory sense lines through the sense circuitry shown by the numeral 6 on the figure and these outputs are in turn directed to the memory data register 7 from which the result may be utilized as desired by the system.

Figure 2:
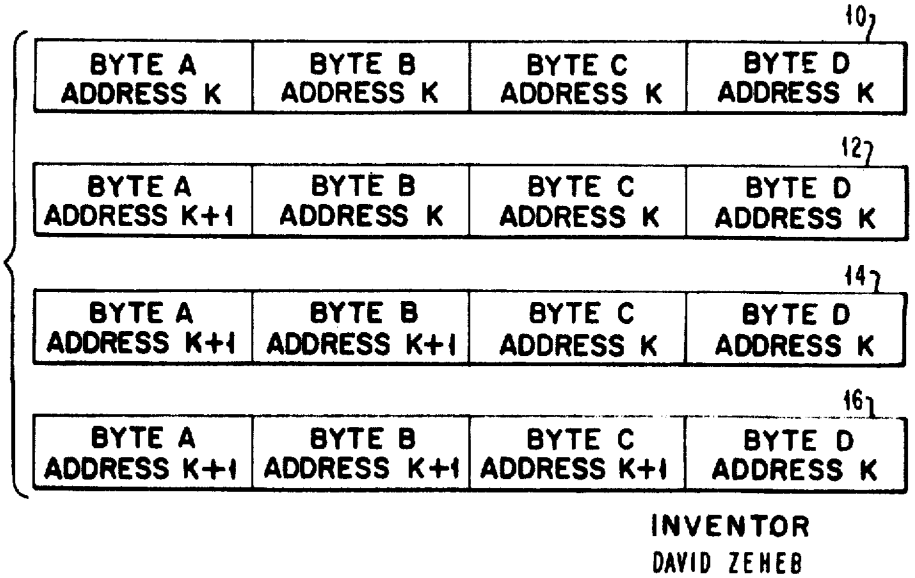
FIG. 2 is a diagram illustrating four different ways in which the memory may be accessed under four different data boundary address conditions.

Referring briefly to FIG. 2, the four possible readout configurations with the present system are illustrated. The four data register words 10, 12, 14 and 16 thus represent the four possible permutations. This of course is the case with a four byte memory word. With a memory organized into b 12 bytes, there would obviously be 12 possible readout combinations. Thus assuming a beginning memory address of K and a first byte storage location A the data word indicated by numeral 10 shows all four bytes coming from the same address, i.e. K. In the examples 12, 14 and 16 the first byte access is byte B, C and D respectively wherein each of these bytes similarly come from address K. However, it will be noted that byte A, in example 12, bytes A and B in example 14 and bytes A, B and C in example 16 come from the address location K+1. Thus as stated previously, with respect to FIG. 1, byte A in the memory data register always comes from section A of the memory, etc. Similarly, bytes B, C and D come from sections B, C and D.

Figure 3:
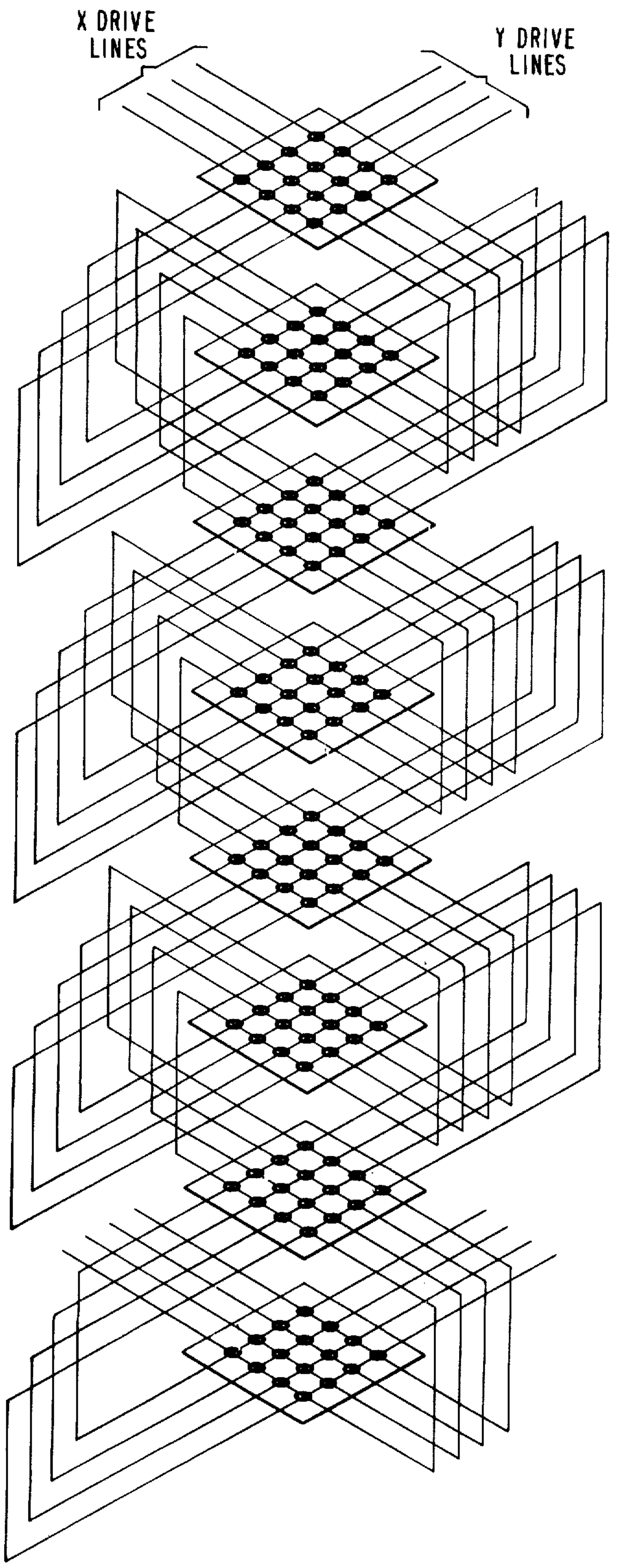
FIG. 3 is a perspective drawing of a one byte section of the memory showing the configuration of the X and Y drive lines in place.
Figure 4:
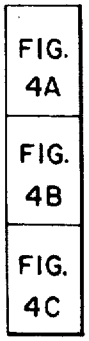
FIG. 4 is an organizational drawing showing the interconnection of FIGS. 4A–4C.
Figure 4A:
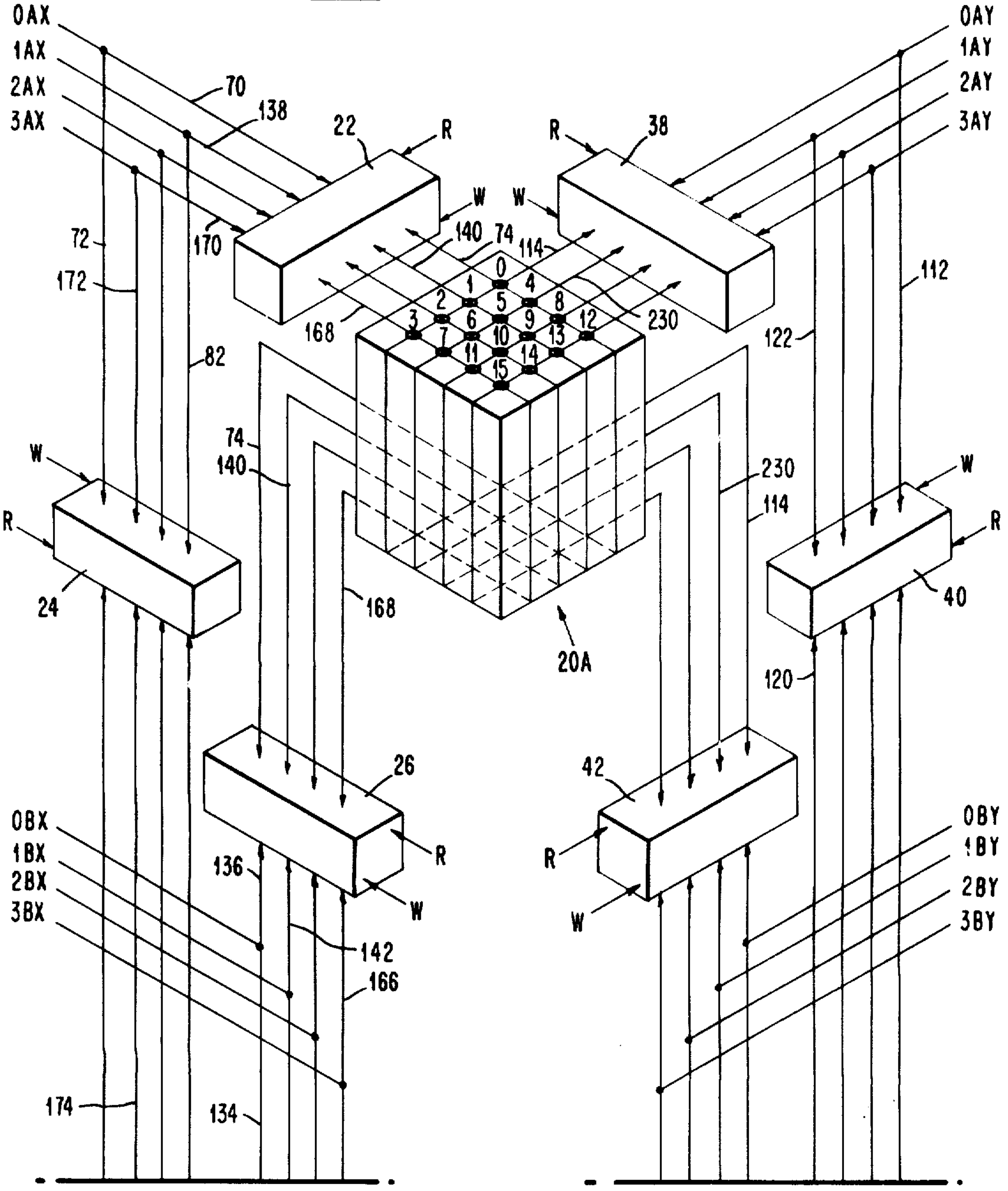
FIGS. 4A–4C comprise an isometric drawing showing the four byte sections of the memory and how the address circuitry thereof is interconnected and further illustrating certain gating circuits configurations which control said memory addressing.
Figure 4B:
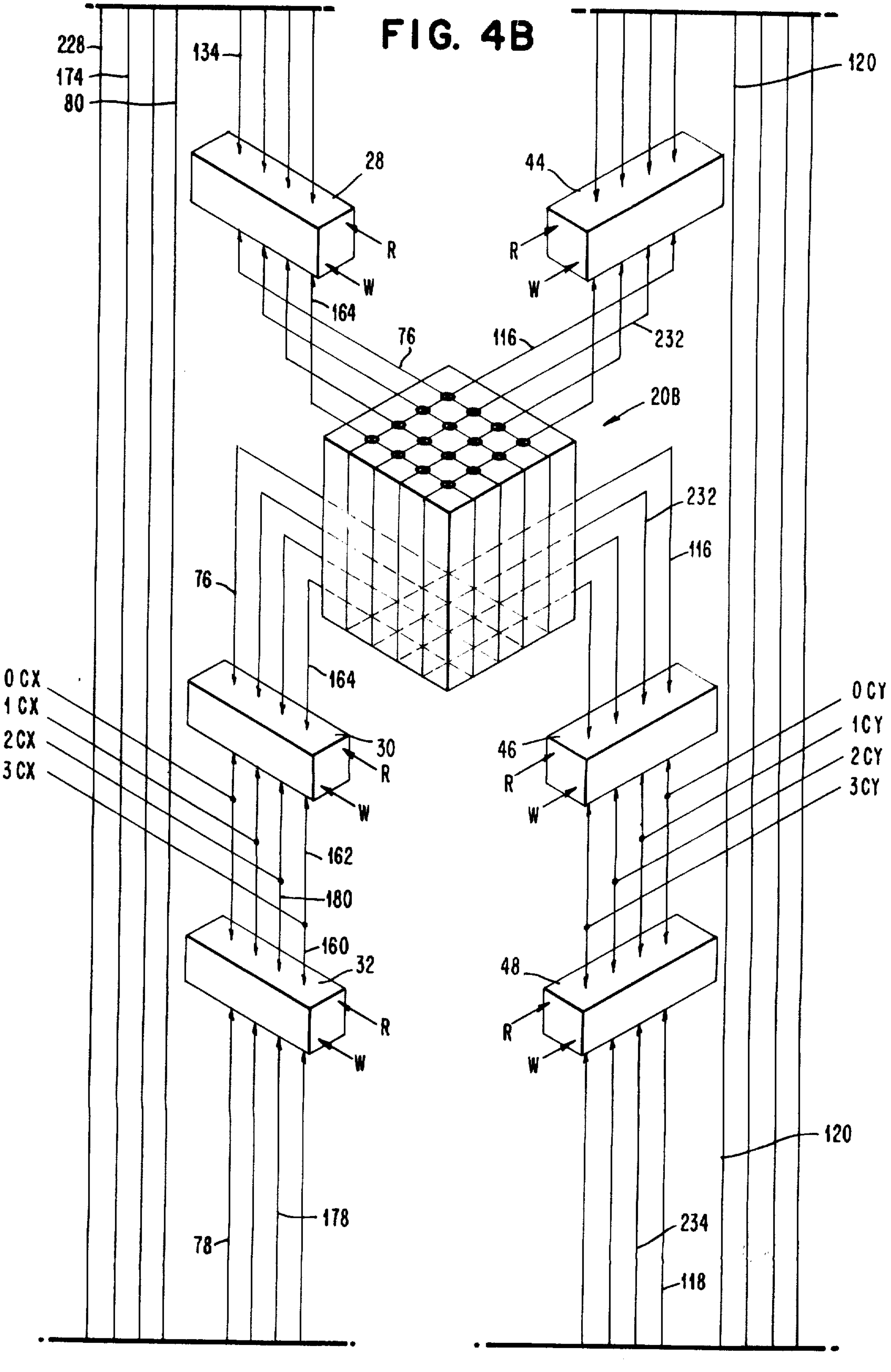
Figure 4C:
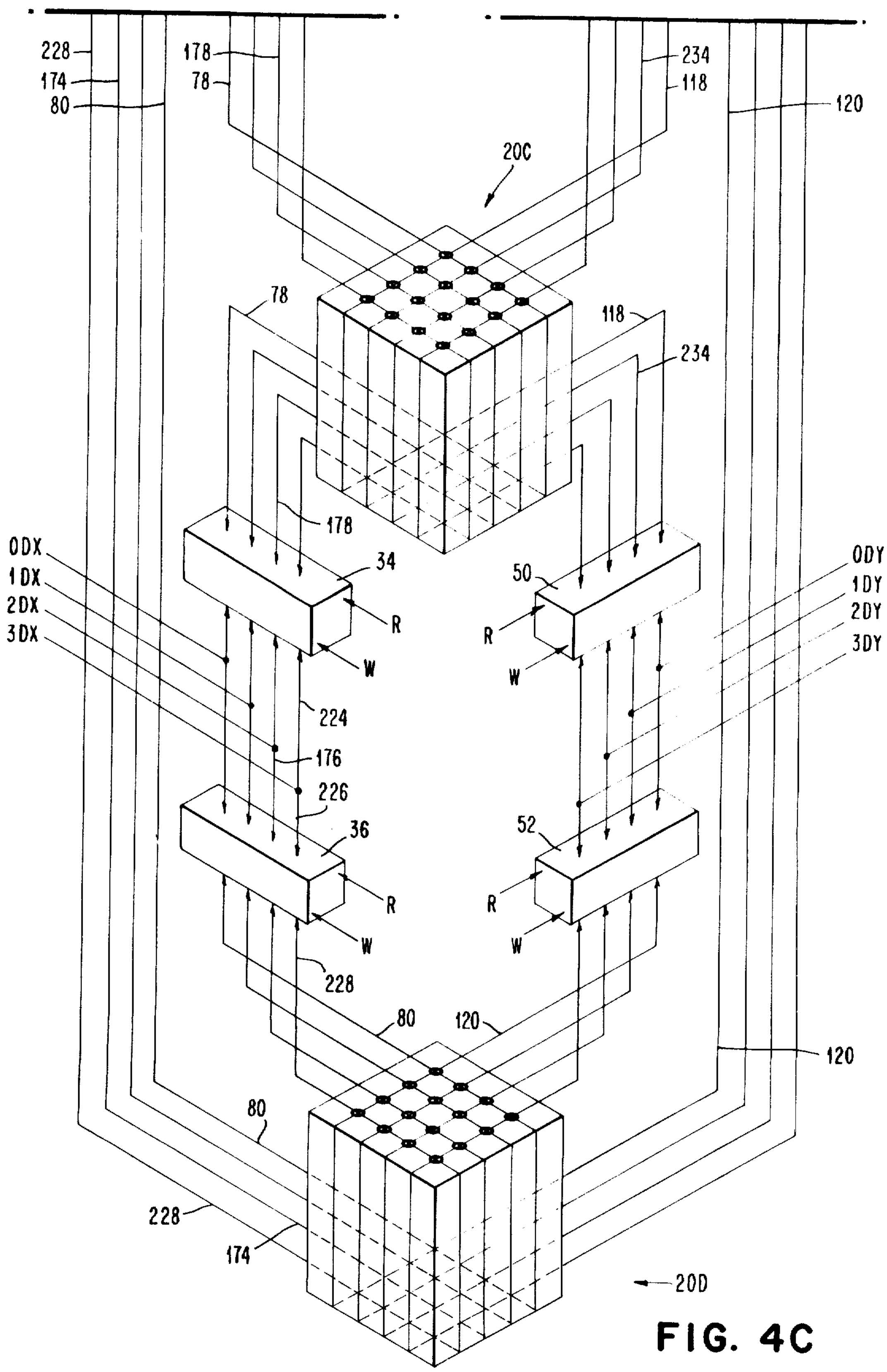

FIG. 3 is a detailed drawing illustrating a single section of memory as shown in FIG. 4 showing each of eight of the memory bit planes and all of the X and Y drive lines in place threading through the individual magnetic storage elements. Each of the sections, such as shown in FIG. 4, is wired identically and further these planes would also have sense and inhibit windings such as are well known in the art. However, since the actual physical readout operation is the same as in any conventional memory these particular windings are not shown as they would merely complicate the disclosure and are very well known in the computer arts. The significant thing is that a given section word or byte may be selected by passing a half select pulse through one of the X drive lines and one of the Y drive lines concurrently. Thus each individual byte storage location within that particular section will receive the full select required for access.

The organization of the individual sections into a four section or four byte memory is clearly shown in FIG. 4. It is noted that the wiring diagram is somewhat simplified in that only the drive lines are shown crossing the top of the memory cube and leaving the bottom. However, it will be understood that they will interlace the various bit planes in the same fashion as in FIG. 3. It will further be noted in referring to FIG. 4 that the various X and Y drive lines pass down through the various sections of memory as though they were not separated. It is further to be noted however that there are a plurality of bidirectional gate circuits which actually control the flow of current within the drive lines in order to achieve a read or a write selection. These gates together with the particular wiring interconnection shown at the top of FIG. 4A achieve the necessary drive line rotation when an access begins at some point in a memory word other than a memory boundary so that the low order bytes must be from the next adjacent machine word such that the drive lines at both the K and K+1 addresses must be energized in the appropriate memory cubes. It will also be noted that all of the line designations in the left-hand portion of FIGS. 5A and 5C connect directly to the similarly labeled lines appearing to either side of FIG. 4. The various groups of output lines of FIG. 5 will be selected in accordance with the X and Y decode operation. While the various input line groups on FIG. 3 would be selected essentially in accordance with the byte address given for a particular memory access and decoded by the decoder 18 on FIG. 5B. Thus by way of example, if the X-Y address portion were decoded to an X address of 2, the third group of lines from the top, i.e., beginning with 2AX on FIG. 5A would be selected by the decoder and further if the B byte is determined to be the first byte access the specific 2BX and 3BX lines would be energized to receive the particular X select current. A similar scheme applies to the selection of the Y drive lines. The output of these lines on FIG. 4A would be connected to the appropriately marked 2BX and 3BX lines at the left-hand portion of FIG. 4A. In this way, during for example a read operation, the select current would come in on line 2BX pass down through the memory through sections B, C and D come back up to the top, pass down through section A and then pass out on the line labeled 3BX to the other side of the driver current source. However, these details of operation together with a description of the particular decoding and line selecting circuitry will be set forth subsequently utilizing all of the examples of FIG. 2. Thus again FIG. 4 shows in a somewhat simplified form the actual X and Y drive lines and the necessary gate circuits which are energized during a READ or WRITE operation.

Figures 5, 5A:
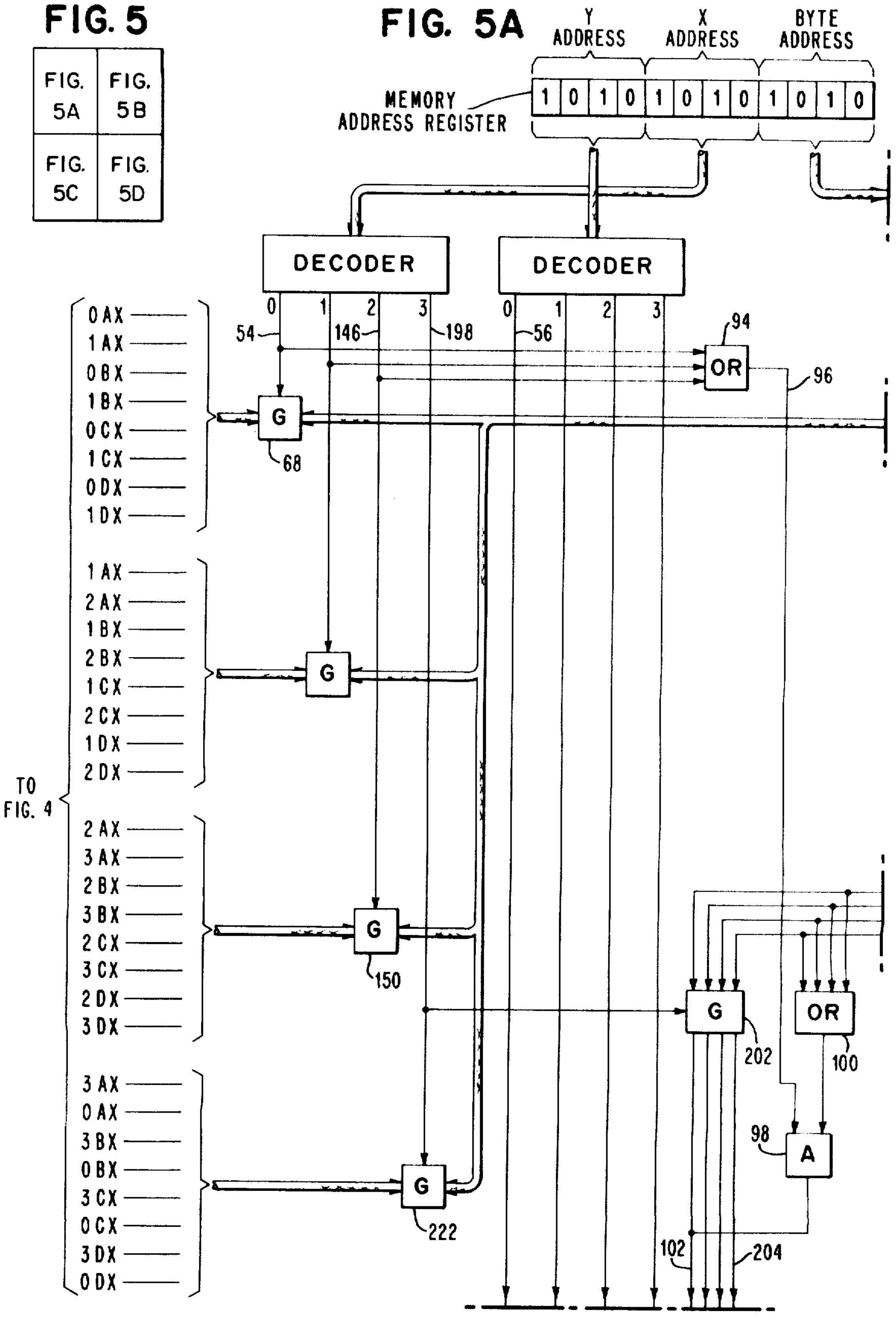
FIG. 5 is an organizational drawing showing the interconnection of FIGS. 5A–5D.
FIGS. 5A–5D comprise a logical schematic drawing showing how the address is decoded and the address switching and rotation circuits are actuated.

FIG. 5 (FIGS. 5A, B, C and D) discloses the logic circuitry utilized in the presently disclosed embodiment for affecting the X-Y address decode and also the byte address decode wherein the drive current source connected to lines 62 and 88 may be applied to the proper X and Y drive lines in order to effect a specified memory access beginning at the specified byte location. The circuitry shown on FIG. 5A and FIG. 5C essentially comprises the X and Y address decoding circuitry and thus control the eight gate circuits connected to the X and Y address decoders. A single one of these gates connected to the output of each decoder will be energized as will be readily understood in accordance with the address stored in the memory address register. The particular lines within the group of lines passing through these gates which are energized is controlled by the byte selection circuitry shown on FIGS. 5B and 5D. The large gate circuits 60, 156, 106 and 194 each comprise a plurality of individual single direction gates as are well known in the field but are shown as a single gate for sake of convenience in these drawings since a single read (R) or write (W) signal may be utilized to energize an entire group. For any given read or write operation, only two of the lines emanating from these gate circuits will be energized for a given read or write operation. The particular pair selected will depend upon the output of the byte address decoder 18. What these two lines provide is a source and a sink for the drive current for the X and Y drive lines respectively.

Figure 5B:
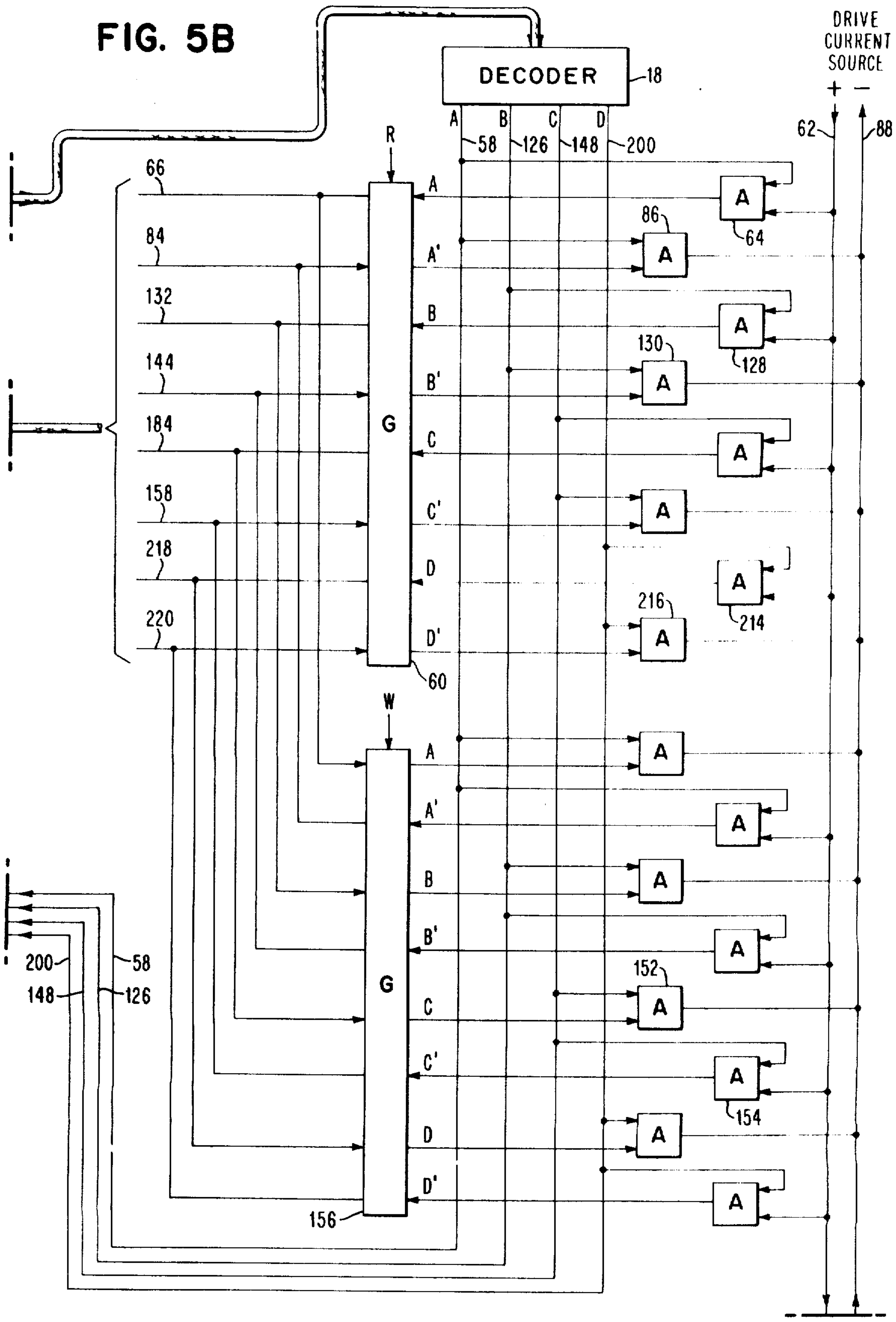
Figure 5C:
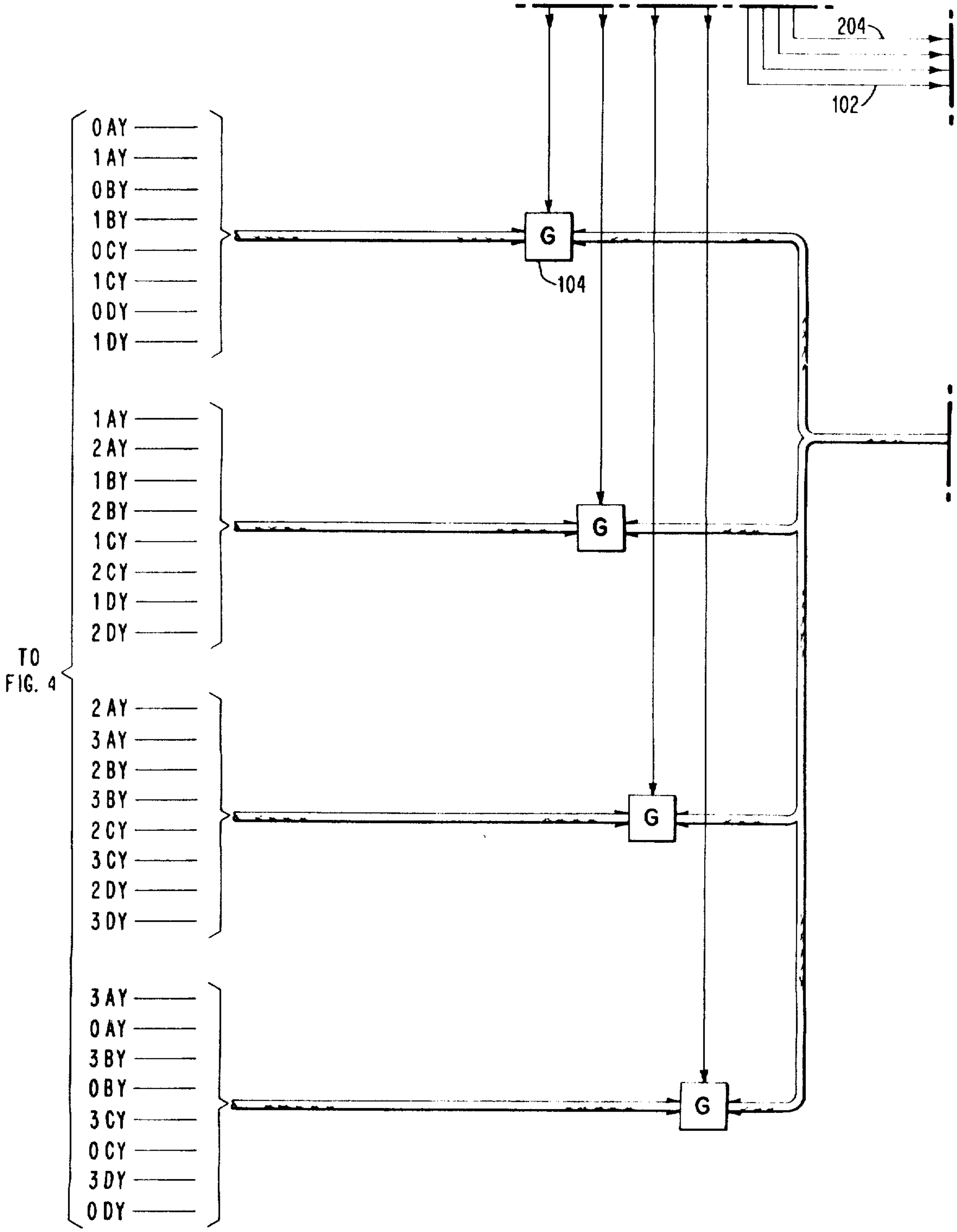
Figure 5D:
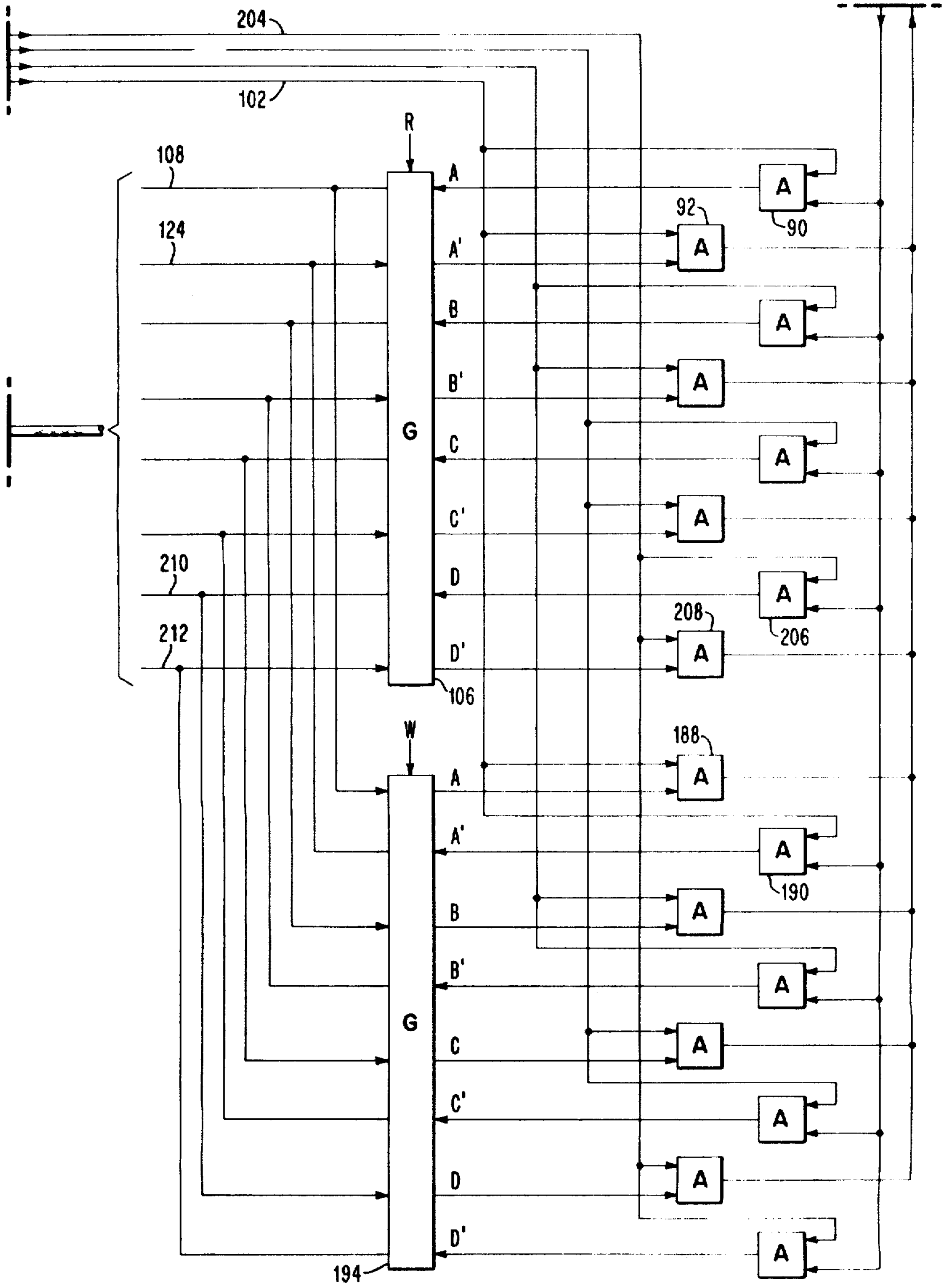

Thus on FIG. 5B, for example, assuming a D byte access is desired, the lines 218 and 220 would provide drive current to the particular X drive line beginning with section D of the memory at the particular address selected by the X decoder. The same operation occurs relative to the selection of two lines from either the gate circuits 106 or 194 which will be connected to the appropriate Y drive lines. The selection of the Y drive circuits is made in accordance with the setting of the byte address decoder 18 together with an input from the address decoding circuitry and including OR circuit 94, OR circuit 100, gate 202 and AND circuit 98 all of which appear on FIG. 5A. This circuitry serves in effect to allow the proper incrementing of the Y drive line address when a byte access begins on other than a word boundary, i.e., not in section A. The specific description of the operation of these circuits, as stated previously, will be set forth subsequently in the detailed description of the four examples shown in FIG. 2.

However, briefly the operation required of the incrementing circuitry is this. Assuming that an access begins at byte C at a particular X address in memory, it will be readily understood that it is only necessary to drive a single Y line through the same plane in all four sections of memory as the rotation will automatically occur in the X drive line. That is, the X drive line at location K will be energized in sections C and D and the X drive line at location K+1 will be energized in sections A and B. However, if the X address is at the end of a particular line, i.e., address 3, 7, or 11 shown in the memory cube of section A on FIG. 4A, it is necessary to also rotate the Y drive line such that Y line 0 would be energized to obtain bytes C and D from sections C and D but line Y=1 must be energized to obtain the proper full select in sections A and B. It should be noted that in the great majority of memory accesses, lines 108 and 124 as shown on FIG. 5D will be accessed, i.e., a single Y drive line will be selected but that the other line selections must be available in the event of a requested access at the end of any of the X drive lines.

FIG. 6 shows details of the bidirectional gates shown on FIG. 4 wherein the direction is controlled by applying either a Read (R) or a Write (W) pulse to the appropriate gate circuits. The operation of the circuits is thought to be quite obvious and will accordingly not be described in detail. FIG. 7 details the bidirectional gate circuits shown on FIGS. 5A and 5C designated as 68, 150, 222, 104, etc. The operation of these is likewise obvious.

The following description of particular accesses of the present memory system in accordance with the four examples shown on FIG. 2 will clearly and specifically detail the operation of the present memory system and explain the function of the various decoders and gating circuitry under control of the present system which is necessary to effect the particular examples being described.

As stated previously, the format in which the memory word is read into the memory data register is controlled by the two low order bits or the byte address stored in the memory address register shown at the top of FIG. 5A. It will be noted that, the two low order bits of the memory address register are decoded by the decoder 18 into the four lines labeled A, B, C and D. If line A is active, the memory word will be read into the memory data register in the format indicated by the reference character 10 on FIG. 2.

If line B is active, the memory word will be read into the memory address register as indicated by the reference character 12 of FIG. 2.

If line C is active, the memory word will be read into the memory data register in the form indicated by the reference character 16 on FIG. 2. 1

If line D is active, 2 the memory word will be read into the memory data register in the format indicated by the reference character 16 on FIG. 2.

Before proceeding further with the description of the examples, the specific notation utilized for the bidirectional gates appearing on FIG. 4 should be noted. It will be observed that all of these bidirectional gates may be activated by either a read (R) pulse or a write( (W) pulse. These gates are so organized that the direction of current flow through the gate is that indicated by the input arrows closest to the activating line. For example, referring to gate 24 on FIG. 4A, if the W line is active, currents can flow downwardly through the gate 24 as viewed on FIG. 4A. Conversely, if the line labeled R is active, currents can flow upwardly through the gate 24 as viewed on FIG. 4A. Similarly with respect to gate circuit 38 on FIG. 3A, if the line labeled W is active, current can flow from left to right looking at the figure and conversely, if the line labeled R is active, current can flow from right to left looking at the figure.

The readout of memory word 00 (shown in Section A on FIG. 4A) in the format indicated by the reference character 10 on FIG. 1 will next be described. On FIG. 5, wires 54, 56 and 58 will be active. During any "read" operation in the memory, the wires labeled R will be active and during any "-write" operation in the memory, the wires labeled W will be active. The path of the X driver (through word 00) during the "read" portion of the memory cycle will first be described. This circuit extends from wire 62 (one side of the drive current source) on FIG. 5 through AND circuit 64, through the gate 60 to the wire 66. Wire 66 extends through the gate 68 to the wire labeled OAX. Wire 0AX extends to FIG. 4 where it is connected to wires 70 and 72. Current cannot flow through wire 72 because the R input to the gate 24 is active, thus permitting only upward flow of current through the gate 24. Current can however, flow through the wire 70 because the gate 22 will permit it. It may be seen that current will flow through wire 74 which is the X driver for the 00 word in section 20A of the memory. The current on wire 74 will flow downwardly through gates 26 and 28 and appear on wire 76 which is the X driver for the 00 word in Section 20B. The current in wire 76 will continue to flow downwardly through gates 30 and 32 and appear on wire 78 which is the X driver for the 00 word in memory Section 20C. The current in wire 78 will flow downwardly through gates 34 and 36 and appear on wire 80 which is the X driver for word 00 in memory Section 20D. Wire 80 extends to the top of FIG. 4A where it passes upwardly through gate 24 and appears on wire 82 which is connected to wire 1AX. Current thus passes through wire 1AX which extends to FIG. 5A and extends through the gate 68 and appears on wire 84 and passes through the gate 60, AND circuit 86 to wire 88 which is the other side of the drive source. In this manner, the cores for word 00 are half selected in the X direction.

The circuit for the Y driver for word 00 will next be traced. Referring to FIG. 5, it will be noted that the OR circuit 94 has an output which appears on wire 96. Wire 96 enables AND circuit 98.

The active state of wire 58 will thus extend through the OR circuit 100 and the AND circuit 98 to the wire 102 which enables AND circuits 90 and 92. Current will thus flow from wire 62 (one side of the driver current source) through the AND circuit 90, through the gate 106 and appear on wire 108. The current on wire 108 passes through the gate 104 and appears on wire 0AY. Wire 0AY extends to FIG. 4 where it is connected to wires 110 and 112. Current cannot flow through wire 112 because, during the "read" portion of the memory cycle, gate 40 can pass currents only in the upward direction as viewed in FIG. 3. Current will flow through wire 110 because the gate 38 will permit it. Current will flow in wire 114, which is the Y driver for the 00 word in the Section 20A of the memory. The current in wire 114 will flow downwardly through gates 42 and 44 and appear on wire 116 which is the Y driver for word 00 in the memory Section 20B. The current in wire 116 will continue to flow downwardly through gates 46 and 48 to the wire 118 which is the Y driver for word 00 in memory Section 20C. The current in wire 118 will continue flowing downwardly through gates 50 and 52 and appears on wire 120 which is the Y driver for word 00 in the memory Section 20D. The wire 120 extends to the top of FIG. 3 where its current passes through the gate 40 and appears on wire 122 which is connected to wire 1AY. The current in wire 1AY extends back to FIG. 5 where it passes through the gate 104 and appears on wire 124. The current in wire 124 passes through the gate 106 and the AND circuit 92 back to wire 88 (other side of the drive current source). In this manner, the cores in word 00 are half selected in the Y direction. This completes the full "read" selection of a given four byte data word. The description of how the data is routed to the memory data register was not given previously.

The readout of the memory word in the format indicated by the reference character 12 on FIG. 2 will next be described. Here it can be assumed that the value of K is 0. In other words, bytes B, C, and D will come from address 0 and byte A will come from address 1 (K+1). The circuit for the Y drivers will be the same as just described for the format indicated by the reference character 10 on FIG. 1 and will not be repeated. It can be mentioned at this point, that the Y drivers are shifted only when the X address is 3 as decoded by the address decoders. On FIG. 5 wires 54 and 56 will be active as before but on the output of decoder 18 wire 126 (B) will be active instead of wire 58. Because wire 126 is active, AND circuits 128 and 130 will be enabled. A current can thus flow from wire 62 (one side of the driver current source) through AND circuit 128, gate 60 and appear on wire 132. The current on wire 132 extends through gate 68 and appears on wire 0BX. Wire 0BX extends to FIG. 4 where it connects to wires 134 and 136. Current cannot flow through wire 136 because gate 126 permits current flow only in the downward direction as viewed in FIG. 4. Current will flow through wire 134 through gate 128 and appear on wire 76 which, as previously described, is the X drive wire for word 00 in Section 20B of the memory. Also, as previously described, the current on wire 76 will flow downwardly through the Sections 20B, 20C and 20D and appear on wire 80 which extends upwardly through gate 24 and appears on wire 82. Wire 82 is connected to wires 1AX and 138. Current cannot flow through wire 1AX because on FIG. 5, AND circuit 86 is not enabled. Current is thus forced to flow through wire 138 and through the gate 22 to wire 140 which is the X driver for word 01 in the memory Section 20A. The current in wire 140 passes downwardly through gate 26 and appears on wire 142 which is connected to wire 1BX. The current returns to wire 88 (the other side of the driver source) on FIG. 5 by the following path. Wire 1BX, gate 68, wire 144, gate 60 and AND circuit 130. In this manner, bytes B, C and D of word 00 and byte A of word 01 are read into the memory data register in the format indicated by the reference character 12 on FIG. 2.

The next operation to be described will be a "write" operation assuming that the data in the memory data register has the format shown by the reference character 14 in FIG. 2 (byte address is "C"). For this example it will be assumed that the value of K is 2. Accordingly, on FIG. 5 line 146, 56 and 148 will be active. Because line 146 is active, gate 150 will be enabled. AND circuits 152 and 154 will be enabled because line 148 is active. Gate 156 will be enabled because the operation to be described is a "write" operation. On FIG. 4 the bidirectional gates 22–52 inclusive will be conditioned for a "-write" operation. In other words, the W lines will be active instead of the R lines.

Referring to FIG. 5 current will flow from wire 62 (one side of the driver current source) through AND circuit 154, through the gate 156 to wire 158. The current on wire 158 extends through the gate 150 and appears on wire 3CX which extends to FIG. 4. On FIG. 4 wire 3CX is connected to wires 160 and 162. Current cannot flow in wire 160 because gate 132 is now conditioned to pass only upwardly extending currents. Current therefore flows through wire 162, upwardly through gate 30 to wire 164. Wire 164 is the X driver for the 20B section of the memory. The current on wire 164 passes upwardly through gate 128 and appears on wire 166. At this point, it will be noted that current cannot extend into wire 3BX which is connected to wire 166 because if wire 3BX is traced back through FIG. 5, it will be noted that no circuit can be completed through it. Current on wire 166 flows upwardly through gate 26 to wire 168 which is the X drive wire for word 03 in memory Section 20A. The current on wire 168 extends through the gate 22 to wire 170 which is connected to wires 3AX and wire 172. No circuit can be completed via wire 3AX so the current must flow downwardly through wire 172. The current on wire 172 flows downwardly through gate 24 and appears on wire 174. Wire 174 extends to the bottom of FIG. 4 and it will be noted that it is the X drive wire for word 02 in the memory 20D. The current on wire 174 flows upwardly through gate 36 to wire 176. Wire 2DX is connected to wire 176 but no current can flow through wire 2DX at this time. The current therefore must extend upwardly on wire 176 through gate 34 and appear on wire 178 which is the X drive wire for word 02 in memory Section 20C. The current on wire 178 flows upwardly through gate 32 to wire 180. Wire 2CX is connected to wire 180 and, at this time, a circuit can be completed via wire 2CX by the following path. Wire 2CX, gate 150, wire 184, the gate 156, and AND circuit 152 to drive current wire 88. In the manner just described, the bytes A and B in the memory data register are written into the 03 word position of memory Sections 20A and 20B. The bytes C and D are written into the word 02 position of the memory Sections 20C and 20D. At the same time that the X drivers were energized in order to write the word shown by the format indicated by reference character 14 on FIG. 2, the Y driver for the Y address of 0 was also energized. This circuit can be traced as follows. On FIG. 5, wire 56 is active which enables gate 104. The active state of wire 148 extends through OR circuit 100 and AND 98 to wire 102 which enables AND circuits 188 and 190. A circuit thus extends from drive current source wire 62 through AND circuit 190, gate 194 to wire 124 which extends through gate 104 to wire 1AY. Wire 1AY extends to FIG. 4 where it is connected to wires 196 and 122. No current can flow through wire 196 because of the condition of gate 38. Current must therefore flow downwardly via wire 122 through the gate 40 and appear on wire 120. Wire 120 extends to the bottom of FIG. 4 where it becomes the Y drive wire and provides a half select pulse to words 00, 01, 02 and 03 in the memory Section 20D. The current on wire 120 extends upwardly through gates 52 and 50 and appears on wire 118. No circuit can be completed at this time through wire 0DY. Wire 118 is the Y drive wire for words 00, 01, 02 and 03 of memory Section 20C. The current on wire 118 extends upwardly through gates 48 and 46 and appears on wire 116. No circuit can be completed at this time through wire 0CY. Wire 116 is the Y driver for words 00, 01, 02 and 03 of memory Section 20B. The current on wire 116 extends upwardly through gates 44 and 42 and appears on wire 114. No circuit can be completed at this time through wire 0BY. Wire 114 is the Y drive wire for words 00, 01, 02 and 03 of memory Section 20A. The current on wire 114 then passes down through the gate 38 and appears on wire 110 which is connected to wire 0AY. The current on wire 0AY flows back to FIG. 5 and passes through gate 104 to appear on wire 108. The path from wire 108 is through gate 194, AND circuit 188 to the other drive current wire 88.

The next circuit to be described will be the circuit for the format shown by the reference character 16 on FIG. 2. Here, if we assume a value of K equal to 3, byte D will be read from word address 03 and bytes A, B and C will be read from word address 04. In this example, it will be necessary to shift both the X drivers and the Y drivers in order to shift from word address 03 to word address 04.

On FIG. 5, wires 198, 56 and 200 emanating from the three address decoders will be active. Because wire 198 is active, the gate 202 will be enabled instead of the AND circuit 98. Wire 200 will thus extend to wire 204 which enables AND circuits 206 and 208. The active state of wire 200 enables AND circuits 214 and 216. The X drive circuit for the format indicated by the reference character 16 on FIG. 2 can now be traced. On FIG. 5, this circuit extends from wire 62 (drive current source) through the AND circuit 214 to wire 218. The current on wire 218 extends through the gate 222 to wire 3DX. Wire 3DX extends to FIG. 4 where it connects to wires 224 and 226. Because the operation being described is a "read" operation, current cannot flow upwardly through wire 224. It flows downwardly via wire 226 through the gate 36 and appears on wire 228. Wire 228 is the X drive wire for word 03 in the memory Section 20D. The current on wire 228 extends upwardly through the gate 24 and connects to wire 0AX and wire 70. No circuit can be completed through wire 0AX at this time. Therefore, the current must flow via wire 70 through the gate 22 to wire 74 which is the X drive wire for word address 04 in the memory Section 20A. The current on wire 74 extends downwardly through the gate 26 to wire 136. Wire 136 connects to wires 0BX and 134. No circuit can be completed through wire 0BX at this time. A current therefor flows downwardly via wire 134, through the gate 28 to wire 76 which is the X drive wire for word address 04 in memory Section 20B. The current on wire 76 extends downwardly through gate 30 and gate 32 to wire 78. It will be noted that, at this time, no circuit can be completed through wire 0CX. Wire 78 is the X drive wire for word position 4 in memory Section 20C. The current on wire 78 extends downwardly through gate 34 to wire 0DX. A circuit can be completed at this time through wire 0DX as follows. The current on wire 0DX extends to FIG. 5 where it passes through the gate 222 and appears on wire 220. The current on wire 220 passes through the gate 60 and also through the AND circuit 216 to wire 88 (other side of drive current source).

The next circuit to be described will be that for activating the Y drive wire for the "read" operation which is necessary for the format shown by reference character 16 on FIG. 2. On FIG. 5, AND circuits 206 and 208 are both enabled by the active state of wire 204. A circuit can extend from wire 62 through AND circuit 206, gate 106 to wire 210. The current on wire 210 extends through gate 104 to wire 0DY. The current on wire 0DY extends to FIG. 4 where it passes downwardly through gate 52 and appears on wire 120 which is the Y drive wire for word 03 in memory Section 20D. The current on wire 120 extends upwardly through the gate 40 to wire 122 which connects to wire 196 and wire 1AY. No circuit can be completed through wire 1AY at this time. The current therefor travels via wire 196, through the gate 38 to wire 230 which is the Y drive wire for the word 04 in memory Section 20A. The current on wire 230 extends downwardly through gates 42 and 44 to wire 232. It should be noted that, at this time, no circuit can be completed via wire 1BY. Wire 232 is the Y drive wire for word 04 in memory Section 20B. The current on wire 232 extends downwardly through gate 46 and gate 48 to wire 234. Wire 234 is the Y drive wire for word position 4 in the memory Section 20C. The current on wire 234 extends downwardly through the gate 50 where it connects to wire 1DY. A circuit can be completed at this time through wire 1DY as follows. Wire 1DY extends to FIG. 4 and current on it passes through gate 104 and appears on wire 212. The current on wire 212 extends through the gate 106 and the AND circuit 208 to wire 88.

The above described examples set forth in FIG. 2 explained in conjunction with the logical schematic diagrams of FIGS. 4 and 5 clearly explain and describe the operation of the present byte addressable memory system. It will, of course, be understood that many modifications and changes could be made in a memory system constructed generally in accordance with the teachings of the present invention. For example, the specific bidirectional gates and wiring configurations used are believed to be the most straightforward and economical wiring configuration which could be employed. However, more complex driving arrangements could be used, for example, the four sections of memory could be separately organized with completely separate drivers and given sections could be automatically accessed for the desired byte under control of a common set of word address and byte address decoders. In such a configuration, separate address incrementing circuits would have to be provided in order to increment the X and/or Y addresses where necessary to obtain the proper word drive in a given section of memory when the byte address given is other than A. However, it is believed that the details of providing such an embodiment would be with the skill of a routineer in the art.

While the invention has been particularly shown and described with reference to a preferred embodiment thereof, it will be understood by those skilled in the art that the various changes in form and details may be made therein without departing from the spirit and scope of the invention.

What I claim is:

1. An addressable random access memory system including a memory per se, address and data register means, said memory being organized so that each memory word consists of M bytes, and said memory is organized in M separately addressable sections, each byte being in a different section, said memory system including means for accessing a data word of up to M bytes beginning at any specified byte within a given memory word, means in said memory address register for specifying the particular byte location and the section at which a given data word access is to begin, means for energizing the proper drive lines of each section of said memory for concurrently accessing in a single memory access cycle only those bytes specified, even though said bytes are in adjacent memory words, and means for storing the accessed data word in said data register means.

2. A random access memory system as set forth in claim 1 wherein said means for concurrently accessing desired byte locations in said distinct sections comprises means for combining the word address of the first byte to be accessed and the byte address per se.

3. A random access memory as set forth in claim 1 including means for serially connecting all drive lines for a particular coordinate in each section in the memory to a single drive source.

4. A random access memory as set forth in claim 3 wherein each section of said memory has the same number of addressable byte storage locations and the same number of drive lines therefor and means for energizing selected drive lines in each section for desired memory accessing operations.

5. A random access memory as set forth in claim 4 wherein a given byte in each section is accessed by energizing the appropriate X and Y drive lines concurrently said system including decoding means operable in response to a memory address for selecting particular X and Y drive lines for accessing the first byte of a particular memory access.

6. A random access memory as set forth in claim 5 including logic means operable under control of the word address and byte address for determining if the X and Y access in a particular section of memory is to occur at the word address specified or whether this word address must be effectively incremented by one, and means for incrementing said word address upon a signal from said determining means for selecting the proper X and Y drive lines.

7. A random access memory as set forth in claim 6 including gate means for selectively interconnecting both the X and Y drive lines of each memory section in order that each of the X and Y drive currents provide the necessary half select pulse to only those byte locations in each section of memory which are to be accessed.

8. A random access memory as set forth in claim 7 wherein said gates are bidirectional, the particular direction of current flow therethrough being determined by whether a specified operation is read or a write access and wherein the same decoding logical circuitry may be utilized for both a read and a write access cycle in said memory.